United States Patent [19]

Krone

[11] Patent Number: 5,203,940

[45] Date of Patent: Apr. 20, 1993

[54] METHOD AND APPARATUS FOR THERMOFORMING PLASTIC SHEETS

[75] Inventor: James R. Krone, Bartlesville, Okla.

[73] Assignee: Phillips Petroleum Company, Bartlesville, Okla.

[21] Appl. No.: 796,498

[22] Filed: Nov. 22, 1991

[51] Int. Cl.⁵ .............................................. B32B 31/04
[52] U.S. Cl. .................................... 156/196; 156/245; 156/500; 264/108; 264/109; 264/112; 264/113; 264/119; 425/410; 425/411; 425/412; 425/417; 425/419; 425/423
[58] Field of Search ...................... 156/196, 62.2, 62.6, 156/62.8, 140, 245, 500; 264/108, 109, 112, 113, 119; 249/82, 117, 154; 425/346, 352, 358, 410, 411, 412, 419, 423

[56] References Cited

U.S. PATENT DOCUMENTS

| | | | |
|---|---|---|---|
| 3,947,207 | 3/1976 | Magidson et al. | 156/245 |
| 3,995,763 | 12/1976 | Ayres et al. | 220/74 |
| 4,181,551 | 1/1980 | Ward | 156/199 |
| 4,360,491 | 11/1982 | Holden, Jr. | 264/294 |
| 4,364,884 | 12/1982 | Traut | 264/119 |
| 4,398,981 | 8/1983 | Ellis | 156/245 |
| 4,421,712 | 12/1983 | Winstead | 264/551 |
| 4,778,717 | 10/1988 | Fitchmun | 428/246 |
| 4,937,032 | 6/1990 | Krone et al. | 264/255 |
| 4,961,700 | 10/1990 | Dûnbar | 425/423 |

Primary Examiner—Caleb Weston
Attorney, Agent, or Firm—David L. Kinsinger

[57] ABSTRACT

A technique is provided for forming an article having a sharp, detailed edge by thermoforming thermoplastic resin prepregs containing randomly arranged reinforcing fibers and ordered, substantially continuous reinforcing fibers. The thermoforming mold used for this technique has a mold cavity with a wedge-shaped interior portion and a mold plug with a wedge-shaped exterior portion wherein the mold plug is capable of applying additional pressure along its edge section. The randomly arranged reinforcing fibers are utilized to form the sharp edge portion of the resulting article while the ordered, substantially continuous reinforcing fibers are utilized to form the remaining wall portions of the resulting article.

7 Claims, 4 Drawing Sheets

METHOD AND APPARATUS FOR THERMOFORMING PLASTIC SHEETS

This invention relates to method and apparatus for forming articles comprised of fiber-reinforced engineering resin laminated composites, and, more particularly, relates to such method and apparatus for forming articles comprised of fiber reinforced engineering resin laminated composites by a thermoforming process.

In the art of composites, it is common to prepare prepregs of so-called engineering resins in reinforcing fibers. From these prepregs, composites (including laminated composites) are prepared.

To fabricate composites from prepregs, various forming techniques can be used, such as a thermoforming process or the like, the techniques typically employing elevated temperatures and pressures.

In the forming of plastic objects by a thermoforming process, it is conventional to provide a sheet of plastic stock material to be formed into the desired object. The sheet of material is disposed over a die or mold of the object to be formed. The plastic sheet is then heated to a point where it becomes pliable. Next, either positive pressure is applied from above the sheet forcing it into the conforms of the mold or, in the alternative, a vacuum is drawn from below the sheet evacuating the air in the space between the mold surface and the surface of the sheet thereby, in a like manner, drawing the surface of the sheet into the conforms of the mold. The mold is typically water cooled, whereby upon contact of the heated plastic against the cool mold, the plastic sets and may thereafter be removed from the mold. The molded plastic is thereafter trimmed by a die cutting process or the like whereby the scrap plastic from the sheet is trimmed away from the desired object.

One problem with such techniques is that the thermoforming of reinforced composite sheets does not lend itself to providing sharp, complex detail in the finished part. Rather, thermoforming is more suited to gentle contours with generous radii. Thus, it is difficult to use thermoforming to form an article having complex detail, such as a sharp edge.

Accordingly, the present invention overcomes the hereinbefore described problem as well as others, providing a novel method and apparatus for thermoforming manufactured articles comprised of fiber-reinforced engineering resin laminated composites.

One object of the present invention is to provide an improved method and apparatus for fabricating laminated composite structures.

Yet another object of the present invention is to provide an improved method and apparatus for fabricating laminated composite structures by means of a thermoforming technique.

It is another object of the present invention to provide improved methods and apparatus for thermoforming laminated composite structures to provide sharp, complex detail in the finished structures.

Other and further objects, aims, purposes, features, advantages, embodiments, and the like will be apparent to those skilled in the art from the present specification, taken with the associated drawings, and the appended claims.

More particularly, in one aspect, the present invention relates to a thermoforming process for manufacturing a laminated structural composite from two different types of prepregs both comprised of fiber-reinforced, high-performance thermoplastic resin, a first such prepreg type incorporating an ordered arrangement or pattern comprised substantially of continuous reinforcing fibers, and a second such prepreg type incorporating a random arrangement of reinforcing fibers which can be continuous or staple fibers, wherein portions of the structure having gentle contours with generous radii are derived from such first prepreg type while portions of the structure having sharp, complex detail are derived from the second prepreg type. By using such a process, manufacturing of such a laminated structural composite is accomplished in one single thermoforming procedure without the use of any auxiliary adhesive means, and without the use of any auxiliary mechanical fastening means.

In another aspect, the present invention relates to a thermoforming mold structure which is useful in the practice of the composite formation process above characterized.

Figure 1:
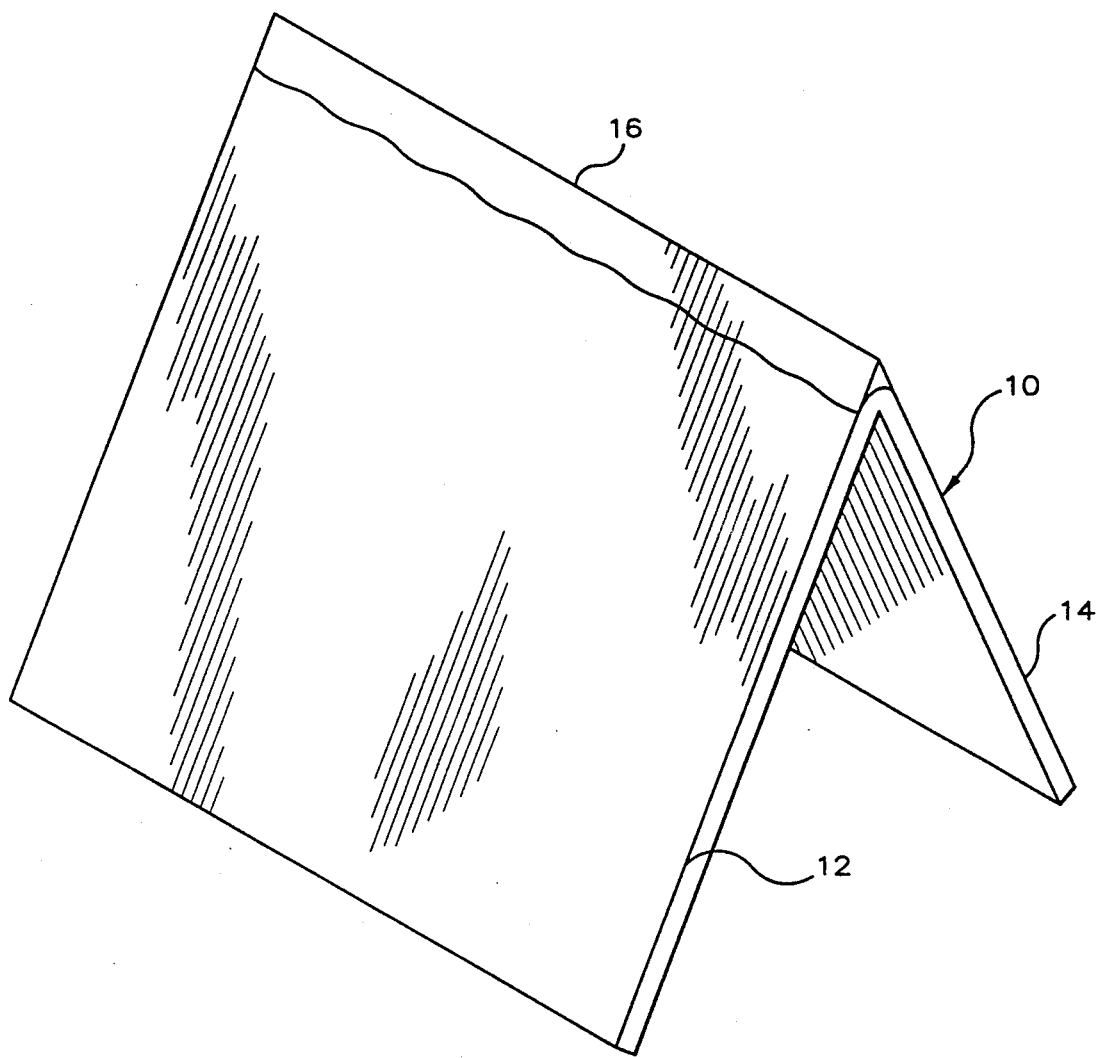
FIG. 1 is an isometric view of one embodiment of a laminated structural composite of the present invention.

For present purposes, a prepreg can be regarded as a fiber-reinforced, self-supporting, heat and pressure processable layer comprising an engineering resin. Such layer is suitably in a sheet, film, ribbon, or like physical form wherein the reinforcing fibers associated with such resin are themselves in various physical forms, such as a woven fabric, a non-woven web or mat, unidirectionally arranged monofilaments, yarns, roving, chopped fiber, pulp, spun-laced sheet, wet-laid paper, and the like. As indicated above, physical properties in product composites in sheet or laminated form are generally improved and even maximized by using continuous fibers which are systematically arranged or ordered in the starting prepregs, such as unidirectional or woven reinforcing fibers. Also, as indicated above, moldability of a starting prepreg directly into a three dimensional fiber reinforced object is enhanced by using starting prepregs wherein the fiber is randomly ordered. Conventionally, and in general, the quantity of total fiber in a prepreg ranges from about 10 to 90 weight percent, while the quantity of thermoplastic resin ranges inversely from about 90 to 10 weight percent (on a 100 weight percent total prepreg basis). Various techniques are known for making prepregs of fiber reinforced high-performance thermoplastic resins.

As those skilled in the art will readily appreciate, any known prepreg forming method can be utilized in the preparation of the respective first and second prepregs used as starting materials in the practice of the invention. In general, the known methods are adaptable for use in making both types of prepregs. Examples of suitable methods include, but are not limited to, (a) a slurry (usually aqueous) impregnation procedure for making stackable sheets such as disclosed in Still et al, U.S. Pat. No. 4,522,875, (b) a pultrusion process such as disclosed in O'Connor, U.S. Pat. No. 4,680,224, (c) a compaction belt method such as disclosed in Ma, U.S. Pat. No. 4,622,192, and (d) an extrusion compacting roller process such as disclosed in Della Vecchia et al, U.S. Pat. No. 4,269,884, and the like.

The thermoplastic resins that are suitable for use in the practice of the present invention conform generally to the definition of "engineering plastics" provided by the Kirk-Othmer Encyclopedia of Chemical Technology (3rd ed., Vol. 9, Wiley-Interscience, New York, 1980, p. 118).

In terms of properties, engineering plastics have a good balance of high tensile properties, stiffness, compressive and shear strength, as well as impact resistance, and they are easily moldable. Their high physical strength properties are reproducible and predictable, and they retrain their physical and electrical properties over a wide range of environmental conditions (heat, cold, chemicals). They can resist mechanical stress for long periods of time. Suitable thermoplastic resin which can be useful in the present invention include:

acetal resins,
polyamides,
polyimides,
polyamideimides
polyetherimides
polyethers,
polyesters,
polycarbonates,
poly(arylene sulfides)
polysulfones, such as polyarylsulfones
polyketones,
combinations of any two or more thereof, and the like. Any one of such respective generic resins can include in its backbone structure other linking moieties that join together repeating units besides the linking moiety designated in its name. As a consequence, the distinctions between different generic resins can become indistinct, as those skilled in the art readily appreciate.

For example, in the case of polyethers, residues of various starting monomers can be linked with non-ether linking groups and such other moieties when present produce various recognized polyether polymer classes, such as polyarylethers (really an all-ether linked polymer), polyether ketones, polyetherether ketones, polyether diketones, polyether sulfones, polyether imides, and the like. Polyarylethers are available commercially, for example, from the duPont Company under its trademark "Aralon", and from the Amoco Performance Products Co. under the trademark "Radel C". Polyether ketones (sometimes known as "PEK") are commercially available from ICI Americas under its "Victrex" trademark, from BASF under its trademark "Ultrapek", and from Hoechst under its trademark "Hostatec". Polyetherether ketones (sometimes known as "PEEK") are available commercially, for example, from ICI Americas under its "Victrex" trademark. Polyether diketones (sometimes known as "PEKK") are believed to be available commercially from the duPont Company (trademark or tradename presently unknown). Polyether sulfones (sometimes known as PES) are commercially available from ICI Americas under its "Victrex" trademark, and are believed to be available commercially from the Amoco Performance Products Company under its trademark "Radel X". Polyether imides (sometimes known as "PEI") are available commercially from the General Electric Company under its trademark "Ultem".

For another example, in the case of poly(arylene sulfides), various starting monomers and various non-sulfide linking groups can be involved. When, for example, poly(arylene sulfides) (sometimes known as "PAS") are considered, various polymer classes can be identified, such as poly(phenylene sulfide) (sometimes known as "PPS"), poly(arylene sulfide ketone) (sometimes known as "PASK"), poly(arylene sulfide sulfone) (sometimes known as "PASS"), poly(biphenylene sulfide) (sometimes known as "PBPS"), and the like. Characteristically, a poly(arylene sulfide) polymer contains a plurality of units (which can be considered to be repeating units but which may not be in adjacent relationship to one another in a polymer backbone chain) of the formula:

—S—Ar— where "S" is a divalent sulfur atom, and "Ar" is a residue from an aromatic starting monomer of the formula:

X—Ar—X where "X" is a halogen selected from the group consisting of chlorine, fluorine, bromine and iodine, and where "Ar" is selected from the group comprising:

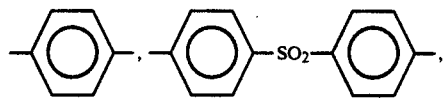

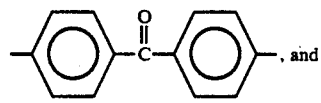

Poly(phenylene sulfide) resins are available from Phillips 66 Company under the trademark "Ryton". Poly(arylene sulfide ketone) resins can be prepared by the teachings of Gaughan, U.S. Pat. No. 4,716,212. Poly(arylene sulfide sulfone) resins can be prepared by the teachings of Campbell, U.S. Pat. No. 4,127,713. Poly(biphenylene sulfide) and other polysulfide resins can be prepared by the teachings of Edmonds, Jr. and Hill, Jr. in U.S. Pat. No. 3,354,129. Poly(arylene sulfides) are preferred thermoplastics for use in the practice of this invention.

Polyimides are available commercially, for example, from the duPont Company under its tradename "J2".

Polyamides are available commercially, for example, from the duPont Company under its tradenames "K II" and "K III", and the Mitsui Company under the trademark "Larc TPI".

Polyamide imides (sometimes known as "PAIs") are commercially available, for example, from Amoco Performance Products under the trademarks "Torlon" and "AI-10".

Polyketones are available commercially, for example, from the Amoco Company under its tradename "HTX" (believed to be a polyarylene ketone).

Polysulfones are available commercially, for example, from Amoco Performance Products, Inc. under the trademark "Udel".

Polyarylsulfones are available commercially, for example, from Amoco Performance Products, Inc. under the trademark "Radel".

Thermoplastic polyesters include (a) terephthalate polyesters, such as polyethylene terephthalate (sometimes known as PET), polypropylene terephthalate (sometimes known as PBT), copolymers thereof, and mixtures thereof, (b) liquid crystal polyesters, and the like. Polybutylene terephthalate is available commercially, for example, from the General Electric Company under the trademark "Valox". Polyethylene terephthalate is available commercially, for example, from Goodyear Tire and Rubber Co. under the trademark "Cleartuf". Reinforced polyethylene terephthalate is available from such companies as duPont (trademark: "Rynite"), Allied-Signal (trademark: "Petra"), Hoechst Celanese Corp. (trademark: "Impet"), General Electric (trademark: "Valox"), Mobay (trademark: "Petlone"), Thermofil, and Wilson Fiberfil (trademark: "Tetrafil"). Liquid crystal thermoplastic polyesters (sometimes known as "LCPs") are available from Dartco Manufacturing under the trademark "Xydar", and from Hoechst Celanaese Corp,. under the trademark "Vectra".

Alloys and blends of such thermoplastic resins can be used in the practice of the present invention provided the blend or alloy has performance characteristics as above indicated for an "engineering plastic". Typically, such a blend or alloy contains at least 2 of such thermoplastic resins each present in a total concentration greater than about 5 weight percent (on a 100 weight percent total alloy or blend basis excluding fiber reinforcement). The principal reason for blending or alloying is to improve the resin cost/performance for a specific end use application, as those skilled in the art appreciate. Specific parameters that may be improved by alloying include, for examples, impact, lubricity, chemical resistance, weatherability, heat, strength, flow, melt strength, and tear resistance. Alloys and blends are conventionally prepared by mixing two or more polymers together in a molten state. Sometimes an alloy can be prepared by two different thermoplastic resins only one of which has properties satisfying the "engineering plastic" definition above given; even so, the alloy can have properties satisfying such definition. Such alloys are suitable for use in the practice of this invention.

Examples of suitable alloys for use in the practice of this invention include ABS/polyamide, ABS/polyvinyl chloride/thermoplastic polyester (where "ABS" refers to copolymers of styrene, butadiene, and acrylonitrile, usually discrete polybutadiene particles dispersed in a glassy matrix of styrene and acrylonitrile copolymer), acetal/elastomer alloys, such as those available from the duPont Company commercially, polycarbonate/polybutylene terephthalate alloys, and polycarbonate/polyethylene terephthalate alloys, especially those which also contain one or more elastomers; polybutylene terephthalate/polyethylene terephthalate alloys; polymeric elastomer alloys with polyethylene terephthalate and/or polybutylene terephthalate; polyethylene terephthalate/polysulfone alloys (especially those which are reinforced with fibers, such as glass or the like), polyphenylene ether/high-impact polystyrene alloys (where high-impact polystyrene (or HIPS) comprises a thermoplastic resin produced from styrene monomer with elastomers, commonly polybutadiene, being introduced into the polymer matrix); polyphenylene ether/polyamide alloys; polyphenylene sulfide/polytetrafluoroethylene alloys; and the like.

As those skilled in the art appreciate, virtually all commercially available thermoplastic materials include additives, such as lubricants, stabilizers, fillers, fiber reinforcement agents, impact modifiers, flame retardants, colorants, anti-microbial agents, and the like. The usage of such additives is intended to produce in a particular thermoplastic resin system an optimum property combination and/or process profile for specific applications. For example, most impact modifiers known or available commercially are polymeric in nature, but preferred impact modifiers for use in the practice of this invention are thermoplastic and have performance characteristics as above indicated for an "engineering plastic". So-called engineering thermoplastic elastomers (sometimes termed ETEs) which also have such performance characteristics can, for example, be incorporated into a starting resin blend or alloy for use in the practice of this invention. Like the suitable thermoplastic resins above characterized and illustrated, ETEs are suitable for use under conditions of high load and creep potential, and have a broad service-temperature range, and are resistant to chemicals. Copolyester elastomers are most common and are preferred. Copolyester resins are available commercially from the duPont Company under the trademarks "Hytrel", and "Bexloy V", from Eastman Chemical Products under the trademark "Ecdel", from Hoechst Celanese Corp. under the trademark "Riteflex", and from the General Electric Company under the trademark "Lomod". If and when employed, the total amount of additives (including impact modifier and/or elastomer) present in a thermoplastic resin employed in the practice of this invention is usually less than about 15 weight percent based on the total weight of thermoplastic resin plus additive(s).

Suitable reinforcing fibers adapted for use in the practice of this invention include those comprised of carbon (including graphite), aramid, glass, quartz, silicon carbide, ceramic, metal coated carbon, metal (such as stainless steel, boron, copper, nickel, and the like), mixtures thereof, and the like. Such fibers are generally available from various suppliers. Presently preferred such fibers include carbon, glass, and aramid.

The diameter of the reinforcing fibers typically ranges from about 10 to 500 microns, but larger and smaller diameter fibers can be used. A present preference is to employ reinforcing fibers having average diameters in the range from about 20 to 100 microns.

For reasons of maximum strength properties, substantially continuous fibers are preferred when woven fabric and unidirectional fibers are employed for fiber reinforcement in starting prepregs having ordered fiber arrangements. In starting prepregs having random reinforcing fiber arrangements, continuous fibers are preferred for strength reasons in those prepregs having an incorporated (impregnated with resin) fiber mat or equivalent. However, discontinuous reinforcing fibers can be used in such prepregs, and, when used, such fibers preferably have an average length of at least about 1 inch. Broadly, reinforcing fibers having a length down to about ⅛ inch (0.3 centimeter) can be employed. Preferably, the average length of randomly arranged or ordered discontinuous fibers used in a prepreg is at least about 10 times the average diameter thereof, and is more preferably at least about 15 times the average diameter thereof, although higher and lower minimum diameter to length ratios can be employed without departing from the spirit and scope of the invention. The term "diameter" as those skilled in the art will appreciate, refers to the width dimension of fiber and such width dimension need not be cross-sectionally circular. In practice, the cross-sectional fiber configuration can be of widely varying form such as elliptical, rectangular, etc. Hence, in estimating a diameter, an an average value is taken for reasons of technical accuracy.

The fibers, whether spatially oriented in an ordered or random configuration, may themselves sometimes be "oriented" in the forming thereof as is known in the art to produce molecular or crystalline "orientation".

Referring to FIG. 1, there is seen an isometric view of one embodiment of a structural composite produced in accordance with the present invention which is herein designated in its entirety by the numeral 10. The structural composite 10 incorporates a first sidewall 12 and a second sidewall 14 wherein first sidewall 12 and second sidewall 14 mutually intersect or contact one another at a common edge 16. In this structure, the first sidewall 12 and the second sidewall 14 are generally continuous and generally flattened except at the edge 16 wherein sharp, complex detail is required.

The first sidewall 12 and the second sidewall 14 are comprised of at least one first prepreg and preferably a plurality of thermally bonded first prepregs each comprising a thermoplastic resin matrix impregnated with reinforcing fibers arranged in an ordered array (such first prepregs having been hereinabove described in greater detail). In a presently preferred embodiment, each such first prepreg is provided with a fiber reinforcement which is comprised of substantially continuous woven glass fibers.

In this embodiment, the material used to form the edge 16 comprises at least one second prepreg, and preferably a plurality of thermally bonded second prepregs, each comprising a thermoplastic resin matrix impregnated with randomly arranged reinforcing fibers (such second prepregs having been hereinabove described in greater detail).

Figure 2:
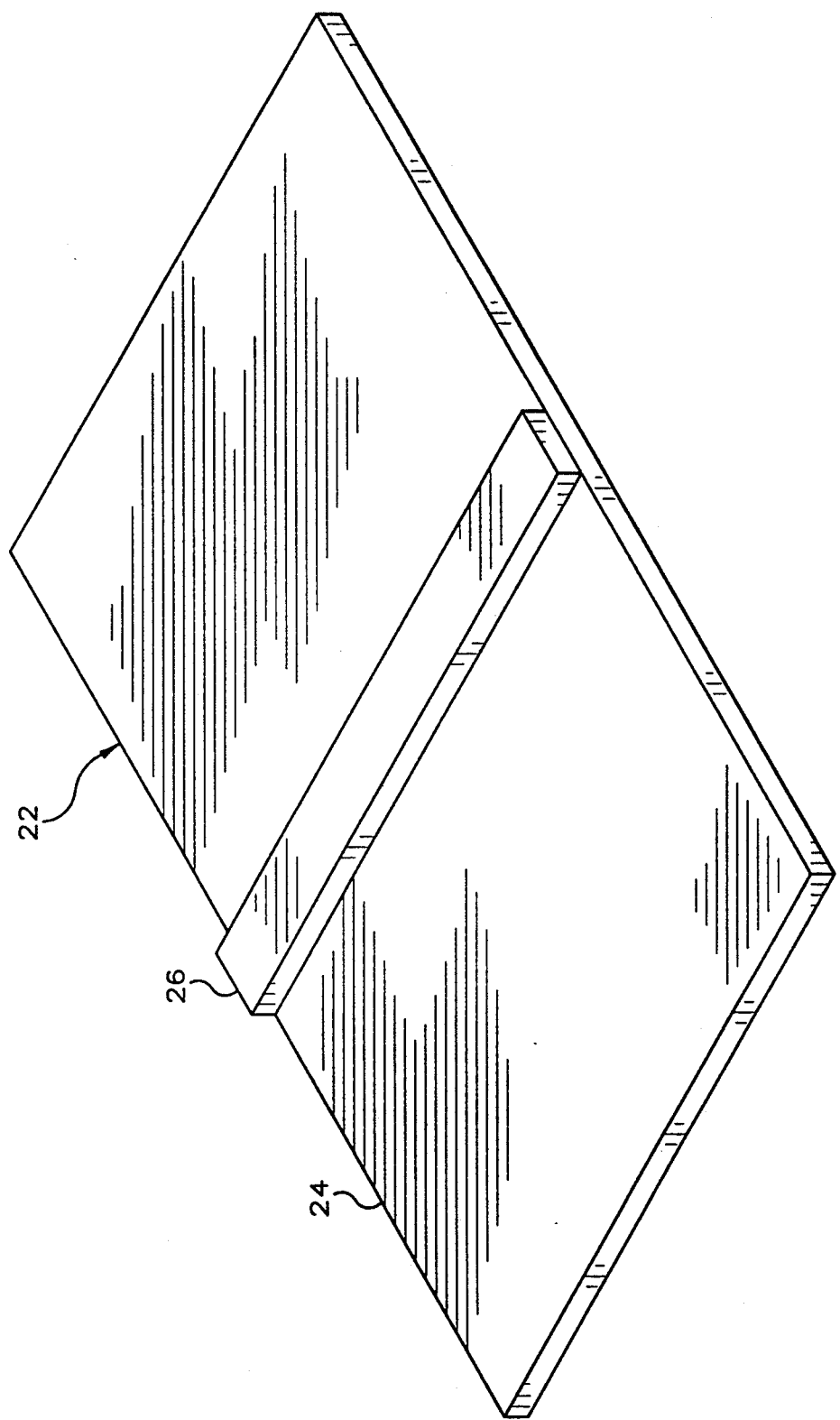
FIG. 2 is an isometric view of one embodiment of the reinforced composite sheets utilized in conjunction with the present invention.

Referring to FIG. 2, there is seen an isometric view of one embodiment of the reinforced composite sheets utilized in accordance with the present invention and which is herein designated in its entirety by the numeral 22. The composite sheet 22 incorporates a wall portion 24 and a detail portion 26. The wall portion 24 is comprised of at least one first prepreg and preferably a plurality of interfacially thermally bonded first prepregs (such first prepregs having been hereinabove described in greater detail). The wall portion 24 is preferably first prepared by laminating together the plurality of first prepregs. The detail portion 26 is comprised of at least one second prepreg and preferably a plurality of interfacially thermally bonded second prepregs (such second prepregs having been hereinabove described in greater detail). The detail portion 26 is placed in contact with the upper surface of the wall portion 24 so as to project outwardly from the wall portion 24.

Figure 3:
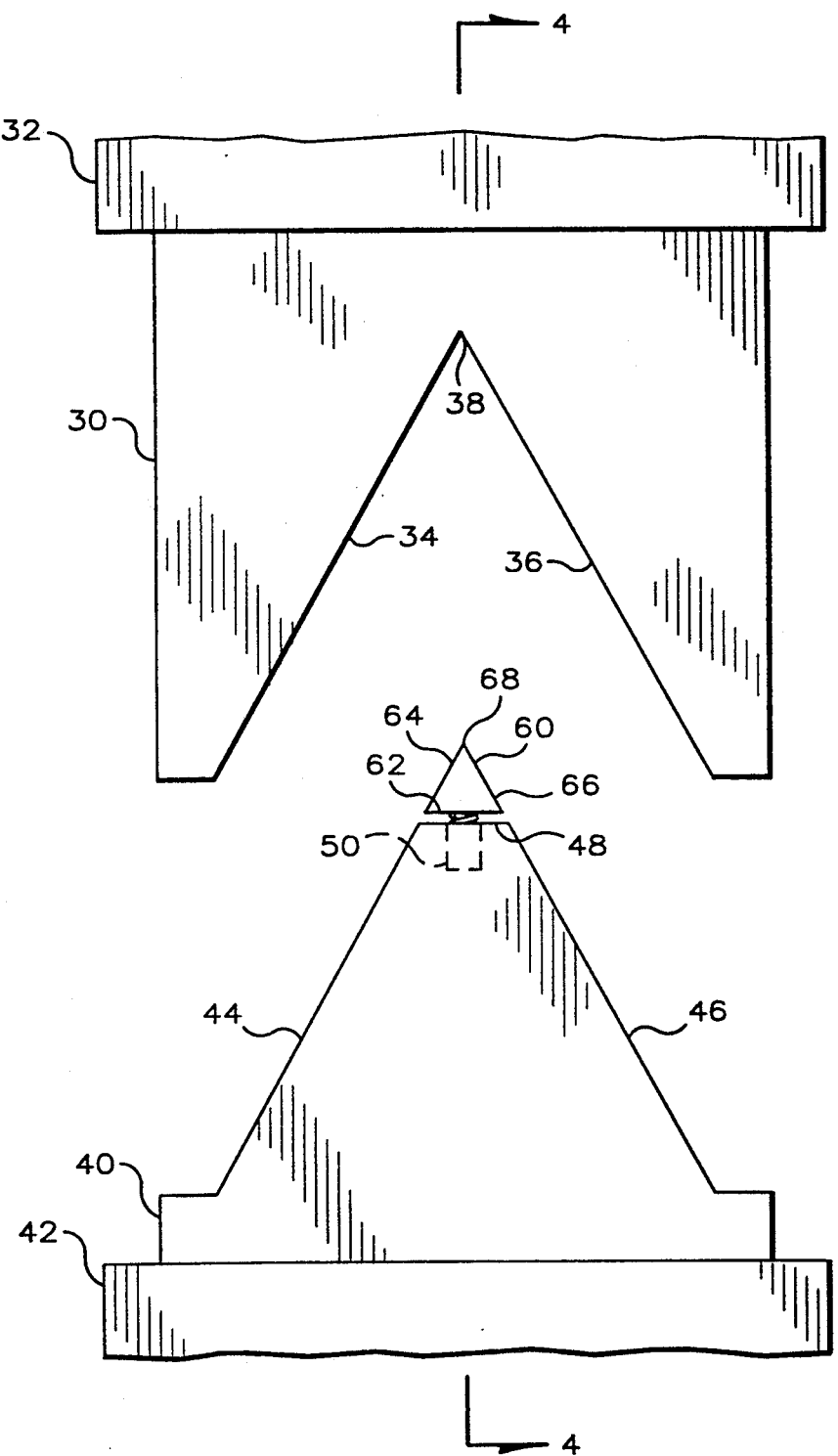
FIG. 3 is a side elevational view of one embodiment of a thermoplastic mold assembly adapted for use in the making of the composite of FIG. 1.
Figure 4:
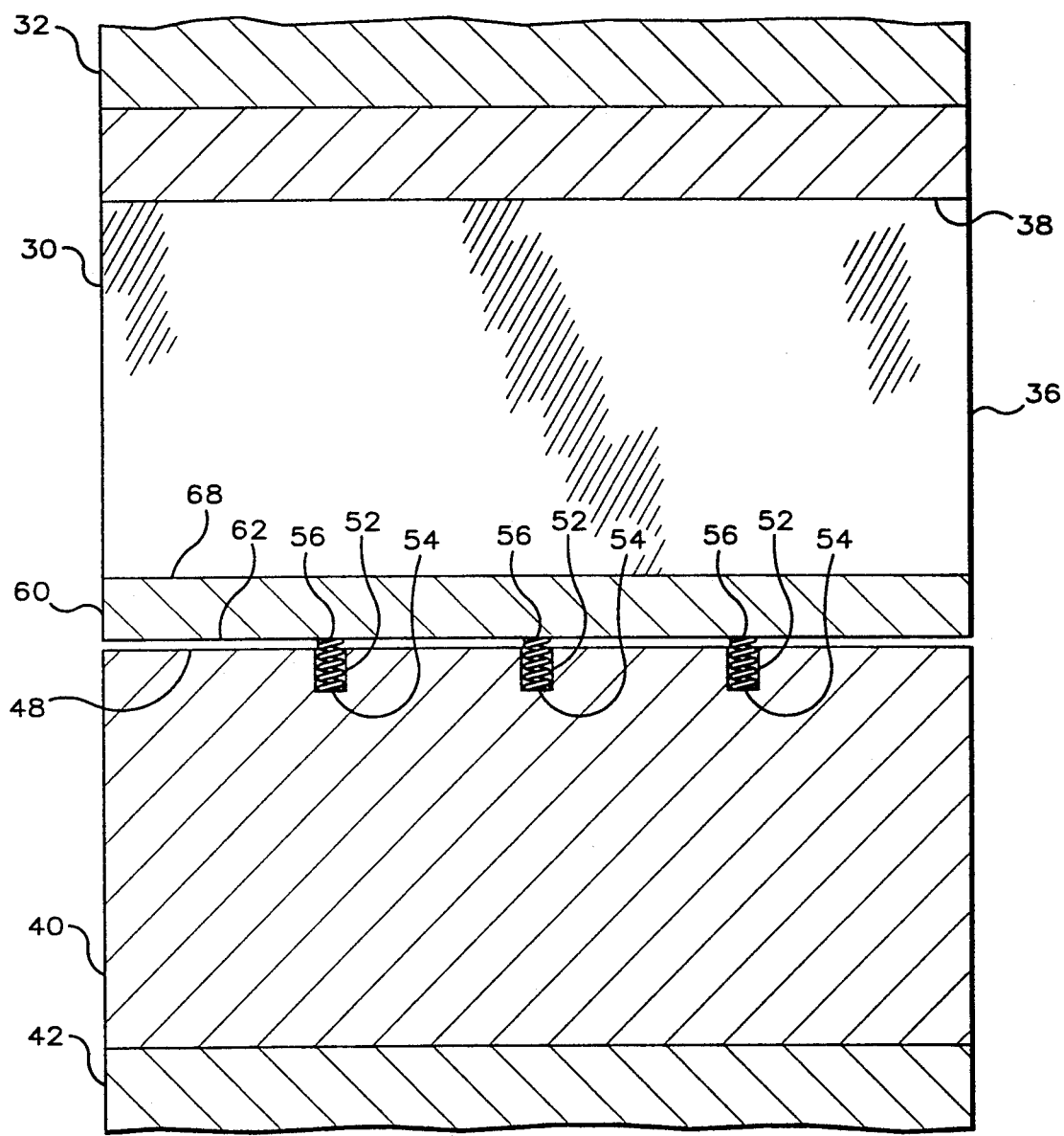
FIG. 4 is a cross-sectional view taken along line 4—4 of FIG. 3.

FIGS. 3 and 4 illustrate the basic apparatus used for molding the composite sheet 22 into the structural composite 10 during a thermoforming process. A mold cavity 30 is fixedly secured to the bottom side of a first platen 32. The mold cavity has a recessed wedge-shaped interior. The wedge-shaped interior of the mold cavity 30 is defined by a first wall 34 and a second wall 36. The first wall 34 and the second wall 36 converge toward one another and mutually intersect along a recessed wedge-shaped mold cavity edge 38.

A mold plug 40 is fixedly secured to the top side of a second platen 42. The mold plug 40 has a protuberant wedge-shaped exterior. The wedge-shaped exterior of the mold plug 40 has a first wall 44 and a second wall 46 corresponding respectively to the first wall 34 and second wall 36 of the mold cavity 30. The first wall 44 and second wall 46 converge toward one another. A mold plug end 48 mutually interconnects the first mold plug wall 44 and the second mold plug wall 46 proximate to the closest convergence of the first mold plug wall 44 and the second mold plug wall 46.

A plurality of blind holes 50 are preferably formed in the mold plug end 48 and extend perpendicularly partially through the mold plug 40. A compression spring 52, is preferably inserted in each hole 50 so that the first end 54 of the spring 52 is in contact with the mold plug 40 and the second end 56 of the spring 52 extends outwardly from the mold plug 40. A mold plug insert 60 is fixedly secured to the second end 56 of each spring 52. The mold plug insert 60 has a mold plug insert end 62 having a flat surface of equivalent dimensions to the mold plug end 48. The second end 56 of each spring 52 is secured to the mold plug insert 60 at the mold plug insert end 62. The mold plug insert 60 has a first wall 64 and a second wall 66 wherein the first wall 64 converges toward the second wall 66 and the first wall 64 mutually intersects the second wall 66 along a protuberant wedge-shaped common edge 68. The compression springs 52 can be compressed so as to allow the mold plug insert end 62 to be positioned in contact with the mold plug end 48. The compression springs 52 provide pressure-exerting means disposed between the mold plug 40 and the mold plug insert 60 for urging the mold plug insert 60 outwardly from the mold plug 40.

In the method of this invention, heat softening of the composite sheet 22 can be accomplished by a known method such as, for example, radiant heating, contact heating or hot air circulation, and no specific restriction is placed on the heat-softening method.

In the case of non-crystalline thermoplastic resin utilized in the composite sheet 22, the temperature for heat-softening the composite sheet 22 is preferably above the glass transition temperature of the thermoplastic resin. In the case of a crystalline thermoplastic resin being utilized in the composite sheet 22, the heat-softening temperature is preferably below the melting point of the resin.

After heat-softening of the composite sheet 22 has been accomplished, the composite sheet 22 is positioned between the mold cavity 30 and the mold plug 40. The composite sheet 22 is positioned so that the detail portion 26 is positioned directly between the mold cavity edge 38 and the mold plug insert edge 68. The first platen 32 and the second platen 42 are compressed toward one another so that the composite sheet 22 is compressed between the mold cavity 30 and the mold plug 40 and the mold plug insert 60. Sufficient pressure is applied for a sufficient time to heat fuse together the wall portion 24 and the detail portion 26 while simultaneously reshaping the wall portion 24 and detail portion 26 so as to form the structural composite 10. The springs 52 located between the mold plug 40 and the mold plug insert 60 will cause a greater pressure to be applied between the mold plug insert 60 and the mold cavity 30 than is applied between the mold plug 40 and the mold cavity 30. This additional pressure is necessary so that the stack of second prepregs comprising the detail portion 26 can be formed into the sharp, complex detail necessary to form the edge 16 of the structural composite 10. Preferably, the pressure between the mold plug insert 60 and the mold cavity 30 is in the range of from about 2 to about 3 times the pressure between the mold plug 40 and the mold cavity 30. After the molding is complete, the thus thermoformed embodiment is allowed to cool in order to form the final structural composite 10.

Reasonable variations and modifications can be made in the construction and arrangement of parts or elements in the embodiment disclosed herein without departing from the spirit and scope of the invention as defined in the following claims.

That which is claimed is:

1. Thermoforming apparatus comprising:
   a first and second platen;
   a mold cavity attached to said first platen wherein said mold cavity comprises a first mold cavity wall and second mold cavity wall, wherein said first mold cavity wall converges toward said second mold cavity wall and said first and second mold cavity walls mutually intersect along a recessed wedge-shaped mold cavity edge;
   a mold plug attached to said second platen wherein said mold plug comprises a first mold plug wall and a second mold plug wall, wherein said first mold plug wall converges toward said second mold plug wall, and a mold plug end mutually interconnecting said first mold plug wall and said second mold plug wall of said first and said second mold plug walls' closest convergence;
   a mold plug insert comprising a mold plug insert end of equivalent dimensions to said mold plug end, wherein said mold plug insert end is disposed adjacent to said mold plug end, a first mold plug insert wall and a second mold plug insert wall adjacent to said mold plug insert end wherein said first mold plug insert wall converges toward said second mold plug insert wall and said first and second mold plug insert walls mutually intersect along a protuberant wedge-shaped edge; and
   pressure-exerting means disposed between said mold plug and said mold plug insert for urging said mold plug insert outwardly from said mold plug.

2. A thermoforming apparatus in accordance with claim 1, wherein said pressure-exerting means comprises a plurality of springs.

3. A thermoforming apparatus in accordance with claim 1, wherein said pressure-exerting means is sized so as to provide in the range of from about 2 to about 3 times the pressure between said mold plug insert and said mold cavity as is provided between said mold plug and said mold cavity.

4. A thermoforming apparatus in accordance with claim 1 wherein said mold plug end comprises a plurality of blind holes formed therein and said pressure-exerting means comprises a plurality of compression springs disposed in said corresponding blind holes in pressure-exerting contact with said mold plug insert.

5. A process for fabricating an integrally formed structural composite comprised of a first and second generally flattened wall portion wherein said first wall portion converges upon said second wall portion and wherein said first wall portion joins said second wall portion at a common edge, said structure being derived from at least one first prepreg and at least one second prepreg each said at least one first prepreg comprising a thermoplastic resin matrix impregnated with reinforcing fibers arranged in an ordered array in such first prepregs, said at least one second prepreg comprising a thermoplastic resin matrix impregnated with randomly arranged reinforcing fibers having an average length of at least about ⅛ inch and an average diameter to length ratio of at least about 1:10, said thermoplastic resin being selected from the resin group consisting of:
   poly(arylene sulfides),
   polyethers,
   polyketones,
   polysulfones,
   polyamides,
   polyimides,
   polyamideimides,
   polyetherimides,
   polyesters,
   polycarbonates,
   acetal resins, and
   combinations of any two or more thereof,
said reinforcing fibers being comprised of a material selected from the group consisting of:
   carbon,
   aramid,
   glass,
   quartz,
   silicon carbide,
   ceramic,
   metal coated carbon,
   metal, and
   combinations of any two or more thereof,
said process comprising the steps of:
   laying up a first stack of interfacially arranged prepregs comprising at least one first prepreg and having a top surface;
   laying up a second stack of interfacially arranged prepregs comprising at least one second prepreg on a predetermined location against the top surface of said first stack of prepregs;
   heating said first and second stack of prepregs to a temperature which is at least sufficient to heat fuse together contacting surface portions of said thermoplastic resin;
   positioning a configuration-defining mold comprising a mold plug having first and second walls mutually intersecting edge portion and an opposed mold cavity having corresponding first and second walls mutually intersecting a corresponding recessed wedge-shaped edge portion exteriorly around the outside surface portion of said first and second stacks of prepregs so that said second stack of prepregs is positioned adjacent said recessed wedge-shaped edge portion of said mold cavity and said edge portion of said mold plug;
   compressing said mold perpendicularly relative to said first and second stacks of prepregs with a prechosen pressure and maintaining said prechosen pressure for a time at least sufficient to heat fuse together said first and second prepregs to one another to produce said integrally formed composite structure comprising said first and second wall portions joined together at said common edge wherein said first and second wall portions are comprised of said first prepregs and said common edge is comprised of said second prepregs.

6. A process in accordance with claim 4 wherein said reinforcing fibers in said at least one second prepreg are at least about 1 inch in average length and have a diameter to length ratio of at least about 1:15.

7. A process in accordance with claim 5, wherein the pressure applied by said protuberant wedge-shaped edge of said mold plug is in the range of from about 2 to about 3 times the pressure applied by said first and second walls of said mold plug.

* * * * *